United States Patent [19]
Brackett et al.

[11] Patent Number: 5,303,078
[45] Date of Patent: Apr. 12, 1994

[54] APPARATUS AND METHOD FOR LARGE SCALE ATM SWITCHING

[75] Inventors: Charles A. Brackett, Mendham; Arturo Cisneros, Lincroft, both of N.J.

[73] Assignee: Bell Communications Research, Inc., Livingston, N.J.

[21] Appl. No.: 902,876

[22] Filed: Jun. 22, 1992

Related U.S. Application Data

[63] Continuation-in-part of Ser. No. 629,584, Dec. 18, 1990, Pat. No. 5,130,984.

[51] Int. Cl.$^5$ ............................................. H04J 14/08
[52] U.S. Cl. .................................. 359/139; 319/123; 319/128; 370/60.1; 370/85.2
[58] Field of Search ..................... 359/123, 120–121, 359/118, 135, 128, 139; 385/16, 17, 24; 370/60.1, 94.1, 85.2

[56] References Cited

U.S. PATENT DOCUMENTS

| | | | |
|---|---|---|---|
| 4,896,934 | 1/1990 | Arthurs et al. | 359/118 |
| 5,005,167 | 4/1991 | Arthurs et al. | 359/135 |
| 5,105,292 | 4/1992 | Le Roy et al. | 359/123 |
| 5,119,370 | 6/1992 | Terry | 370/60.1 |
| 5,194,977 | 3/1993 | Nishio | 359/123 |

OTHER PUBLICATIONS

Suzuki, Nishio, Numai, Fujiwara, Itoh, Murata and Shimosaka, "A Photonic Wavelength Division Switching System Using Tunable Laser Diode Filters", Journal of Lightwave Technology, vol. 8, No. 5, May, 1990, pp. 660–665.

Primary Examiner—Leslie Pascal
Assistant Examiner—K. Negash
Attorney, Agent, or Firm—Leonard Charles Suchyta; Stephen M. Gurey

[57] ABSTRACT

Apparatus and method for large scale asynchronous transfer mode (ATM) switching utilizing tunable lasers and fixed-tuned receivers are provided. The apparatus, an optical switch, includes a plurality of input modules for receiving ATM cells to be switched and a plurality of output modules for outputting the switched ATM cells. The optical switch also includes an optical transmission network for optically transmitting each ATM cell from an input module to a particular output module, and a contention resolution device in electrical communication with the plurality of input modules for selecting the ATM cells from the plurality of input modules to be switched. Preferably, each output module includes a plurality of fixed-tuned receivers and each input module includes a plurality of tunable lasers. The fixed-tuned receivers of each output module are tuned to a particular wavelength so as to pass only those ATM cells optically received from the optical transmission network at the particular wavelength. The tunable lasers are tunable to a plurality of distinct wavelengths for optically transmitting the ATM cell to the optical transmission network at the particular distinct wavelength associated with the output module to which the ATM cell is destined.

16 Claims, 8 Drawing Sheets

A logical queue for each output port

| 1 | Cells queued for the first output port |
| 2 | Cells queued for the second output port |
| n | Cells queued for the last output port |

Single Queue

| 1 | Cells from the first input port |
| 2 | Cells from the second input port |
| n | Cells from the last input port |

APPARATUS AND METHOD FOR LARGE SCALE ATM SWITCHING

CROSS-REFERENCE TO RELATED APPLICATION

This application is a continuation-in-part of U.S. patent application Ser. No. 629,584, filed Dec. 18, 1990 now U.S. Pat. No. 5,130,984, and titled "A Large Fault Tolerant Packet Switch Particularly Suited For Asynchronous Transfer Mode (ATM) Communication", now U.S. Pat. No. 5,130,984, issued Jul. 14, 1992 which is hereby expressly incorporated by reference in its entirety.

TECHNICAL FIELD

This invention relates to a packet switch for use in asynchronous transfer mode (ATM) communication and, more particularly, to a large-capacity, fault tolerant, ATM switch utilizing an optical interconnection.

BACKGROUND ART

In an effort to provide sufficient channel bandwidth to meet expected subscriber demand in a public ISDN environment, the art has turned to implementing so-called broadband ISDN (B-ISDN). In B-ISDN, each subscriber channel is presently envisioned as providing an information transfer capacity of approximately 150 Mbit/S. This rate is chosen to provide a minimally sufficient bandwidth at a subscriber interface to simultaneously carry a broadband video service, such as high definition television (HDTV) and various narrowband services, such as voice and data transmission. Packet switched connections, instead of circuit switched connections, specifically utilizing asynchronous transfer mode (ATM), is the preferred mode of communications over B-ISDN.

Today, large central offices could have up to 100,000 customers. A future broadband ISDN (B-ISDN) central office will be likely to require a switching capacity of 1 Terabit/S ($10^{12}$bit/S) or more. It is estimated that in B-ISDN, each customer will be served with an STS-3c line (operating at 155.52 Mbit/S). Assuming a utilization factor of about 10%, an associated asynchronous transfer mode (ATM) switch will have to handle the capacity of about 10,000 STS-3c lines, or about 1.5 terabit/sec.

Several proposals have been made, within a factor of 10 of a terabit/sec in capacity, for the architecture of such large ATM switches. Almost all use electronic switching components exclusively. An exception, which uses an optical star coupler, is the STAR-TRACK optical multicast switch. The STAR-TRACK optical multicast switch is described in U.S. Pat. Nos. 4,896,934 and 5,005,167, both issued to Arthurs et al. and assigned to the assignee of the present invention. Operation of this switch includes two control phases and a transmission phase. During the control phases, a token is generated and passed sequentially along a track from one input port to another. Each input port writes information into the token indicating the output ports to which their packets are to be sent. The token is then passed sequentially along the track from one output port to the next. The output ports read the token and tune their receivers to the appropriate input port wavelength. During the transmission phase, the packets are then optically transmitted from the input ports to the output ports. Thus, contention resolution involves token passing, a process which not only limits the number of ports capable of being serviced, but which slows the switch capacity.

The possibility of purely photonic packet switching is at present severely limited by the difficulty of buffering packets and reading packet headers in the photonic domain. The buffering function is necessary in a packet switch unless it is unrealistically overbuilt. At present, this function can only be provided electronically in the needed capacity.

SUMMARY OF THE INVENTION

It is therefore an object of the present invention to provide a switch architecture which combines the strengths of electronic switching with the strengths of a dynamic multiwavelength optical interconnect to provide a modular, fault tolerant solution to large-capacity packet switching. Two key ingredients in the architecture are 1) the use of multiple broadcast optical star interconnection networks with tunable lasers and fixed-tuned receivers, and 2) a fast contention resolution device preferably implemented in silicon.

In the preferred embodiment, buffering is combined with levels of switching at the input modules and at the output modules. This is accomplished utilizing memory switches, which are the packet switching analogues of time switches in the circuit world. The interconnection between the input and output modules is accomplished by a cross-coupled arrangement of several optical star couplers operating in parallel. Routing in the interconnection network is preferably accomplished by tuning the lasers at each input module to the wavelengths associated with the destination module, and then broadcasting the optical signals to all output modules where the optical selection is performed.

In carrying out the above object and other objects, features and advantages of the present invention an optical switch is provided comprising a plurality of input modules for receiving ATM cells to be switched and a plurality of output modules for outputting the switched ATM cells. The optical switch also comprises an optical transmission network for optically transmitting each ATM cell from an input module to a particular output module and a contention resolution device in electrical communication with one of the plurality of input modules for selecting the ATM cells froth the plurality of input modules to be switched.

In their preferred construction, each output module includes a plurality of fixed-tuned receivers and each input module includes a plurality of tunable lasers. The fixed-tuned receivers of each output module are tuned to a particular wavelength so as to pass only those ATM cells optically received from the optical transmission network at the particular wavelength. The tunable lasers are tunable to a plurality of distinct wavelength for optically transmitting the ATM cell to the optical transmission network at the particular distinct wavelength associated with the output module to which the ATM cell is destined.

The advantages accruing to the present invention are numerous. For example, use of passive optical couplers which cooperate with tunable lasers and fixed-tuned receivers reduce switch complexity and increase switch reliability.

The above object and other objects, features, and advantages of the present invention will be readily appreciated by one of ordinary skill in the art from the following detailed description of the best mode for carrying out the invention when taken in connection with the accompanying drawings.

DETAILED DESCRIPTION OF THE INVENTION

Figure 1:
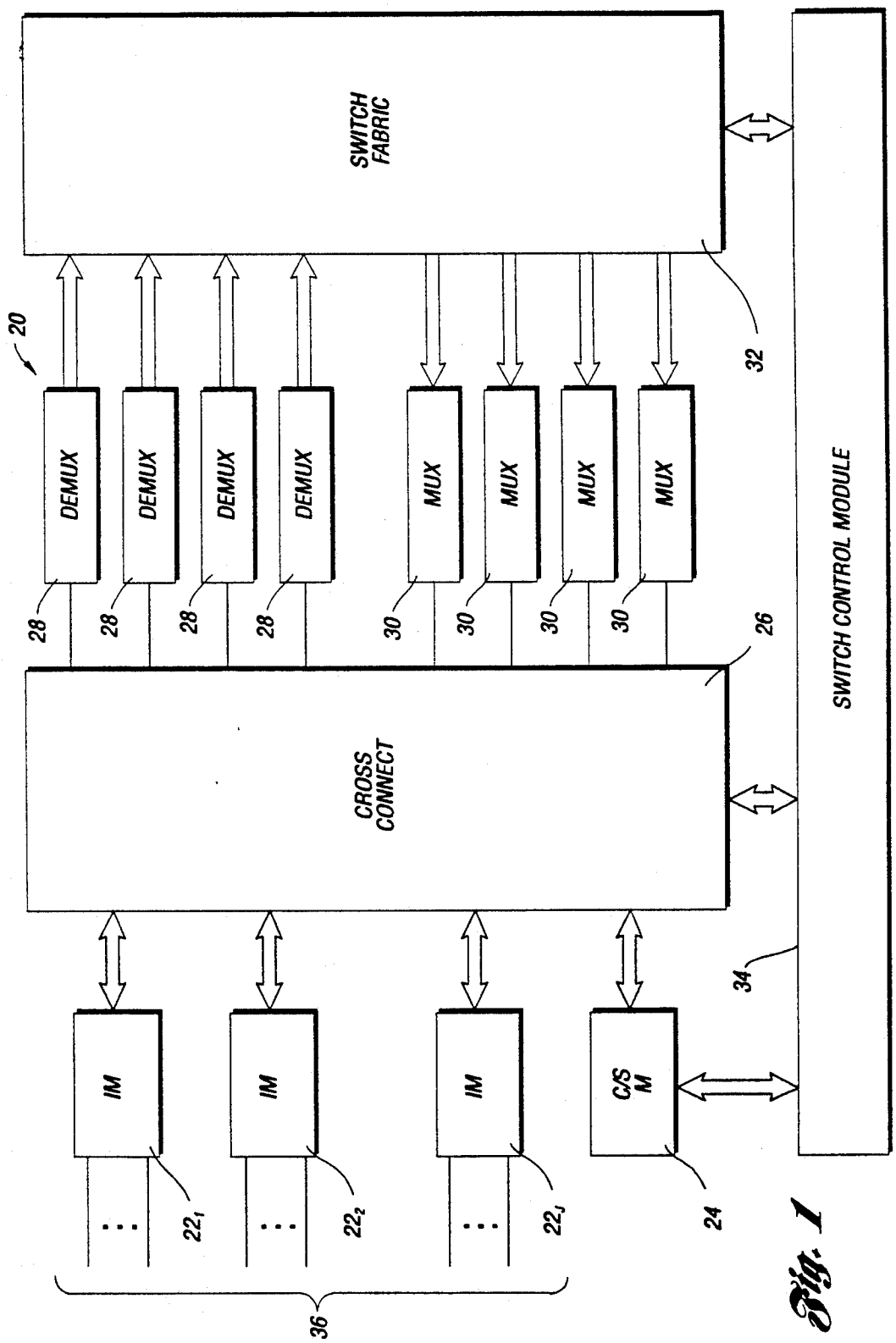
FIG. 1 is a high level block diagram of a preferred embodiment of an ATM switch having a capacity of 2.5 Terabits/S.

Referring now to FIG. 1, there is shown a high level block diagram of the large ATM switch 20 constructed in accordance with the present invention for switching ATM cells, or data packets of fixed size. For purposes of simplification, various control and clocking signals and associated circuit blocks that would be readily apparent to those skilled in the art have been intentionally omitted from this and other figures.

Each ATM cell is typically 53 bytes long and is formed of a header which contains a virtual channel identifier (VCI) field, a priority field and other information not relevant to this invention, followed by all the remaining bits. These bits, which are typically referred to a data, are the so-called "user data" bits and are merely transported unchanged through the switch of the present invention. On an STS-3c line, a 53 byte ATM cell is typically delivered every 2.83 $\mu S$, termed the cell period.

The VCI identifies a specific virtual channel that is to transport the cell and which extends between a node within the B-ISDN network to the next successive such node. The specific channel and hence its corresponding VCI varies from one node to the next as the cell is transported through successive network nodes. The value of priority field is determined during call set-up negotiations and, as a result, is appropriately set by the user terminal that initially produced the cell being switched. This value specifies the priority, relative to that associated with other cells, at which the cell is to be transported through the B-ISDN network. The value of the priority field remains constant as the cell propagates through the network.

The reference to ATM cells is for illustrative purposes. One skilled in the art will appreciate that the switch of the present invention will work equally well with other data structures. Preferably, the packets are of the same size and have a headers that can be translated into a switch output port destination number.

As shown in FIG. 1, the switch 20 is basically formed of a plurality of interface modules 22, control and service module 24, cross-connect 26, a plurality of demultiplexers 28, a plurality of multiplexers 30, a switch fabric 32 and a switch control module 34. The interface modules 22 consist of substantially identical modules $22_1$, $22_2 \ldots 22_j$ and interface a number of user lines 36 to the switch 20. User terminals (well known and not shown) are connected to the far end of each of these user lines and supply incoming ATM cells in bit-serial fashion thereto and receive outgoing ATM cells therefrom.

Each of the interface modules 22 provide a number of essential network functions, such as terminating each of its associated data lines, whether emanating from a user or the network; protecting the B-ISDN network both physically (i.e. electrically) and in terms of maintaining incoming data in an appropriate form suitable for carriage through the network; providing a policing function by, for example, limiting the data rate (i.e. channel bandwidth) accorded to a user to that which the user has specifically contracted; concentrating and sorting incoming packets as needed; and performing cell header translation for each incoming ATM cell and prepending a router header to each such cell. The routing header is preferably prepended to each ATM cell prior to entry of that cell into the switch 20 and is subsequently preferably stripped off of that cell prior to that cell being transmitted into the output virtual channel. In the preferred embodiment, the routing header contains two fields: a most significant 7-bit "H" field which specifies the physical address of a specific output port of an output module 54 to which that cell is destined, and a least-significant 7-bit field "L" field which identifies the specific output module 54 to which the cell is destined. Within the switch 20, the cell is treated simply as data.

Each interface module 22 bidirectionally communicates with the switch 20 by providing incoming cells at an STS-48 rate (i.e. 16 times the basic STS-3c rate or approximately 2.488 Gbit/S) and receiving outgoing cells at the same rate. Each of the interface modules 22 is connected to the switch control module 34 and is appropriately monitored and controlled thereby. Under the control of switch module 34, control and service modules 24 provide special purpose inputs and outputs, such as for packet tests and switch operations and maintenance connections into switch 20.

With continuing reference to FIG. 1, generally speaking, switch control module 34 performs a number of essential control, test and administration functions for switch 20. To effectively perform these functions, switch control module 34 bidirectionally communicates with and controls each of the blocks that constitute switch 20 including the interface modules 22, cross-connect 26 and switch fabric 32. For example, switch control module 34 processes incoming calls by establishing and tearing down appropriate virtual connections through switch 20 for each such call, selecting routes through cross-connect 26 for incoming and outgoing ATM cells that constitute each call handled by switch 20, determining the specific header translation that is to occur within each interface module 22. In addition, the switch control module 34 also performs network maintenance and administrative functions by respectively attempting to locate and repair problems within the network itself and maintaining data on the performance and status of switch 20 and its interactions with the network. Switch control module 34 also distributes traffic between switch 20 and the remainder of the network in order to efficiently use existing network resources. In addition, switch control module 34 also responds to various user inquiries as well to user requests to change service.

Switch control module 34 also performs periodic routine diagnostic tests of the entire switch. In particular, switch control module 34 periodically executes a sequence of diagnostic operations to apply predefined ATM test cells to and test the resulting operation, on an end-to-end basis, of the entire switch 20 as well as to test the operation of each of the blocks, as set forth above, within both the switch 20 and the switch fabric 32. Through these diagnostics, switch control module 34 is able to detect failure conditions and, in the event of such a failure, invoke appropriate corrective actions to counteract the failure. The corrective action taken in response to a failure of switch elements is discussed in greater detail below. In the preferred embodiment, the switch control module 34 is formed of any one of many well-known relatively large stored programmed computers and associated peripheral and memory circuits.

With continuing reference to FIG. 1, cross-connect 26 is a computer-controlled switching matrix that provides circuit switched connections between the interface modules 22 and the demultiplexers 28 and the multiplexers 30. The connections through the cross-connect 26 are established by switch control module 34 and are dynamically changed, as needed, in the event of a failure within switch fabric 32 (i.e. specifically of an input or output module, as discussed in greater detail below) to provide a fault tolerant switching operation. High speed trunks, connected through appropriate specialized interface modules would link switch 20 to other switching nodes situated within a B-ISDN network. Since these trunks are irrelevant to the present invention, they have been omitted from FIG. 1.

Figure 2:
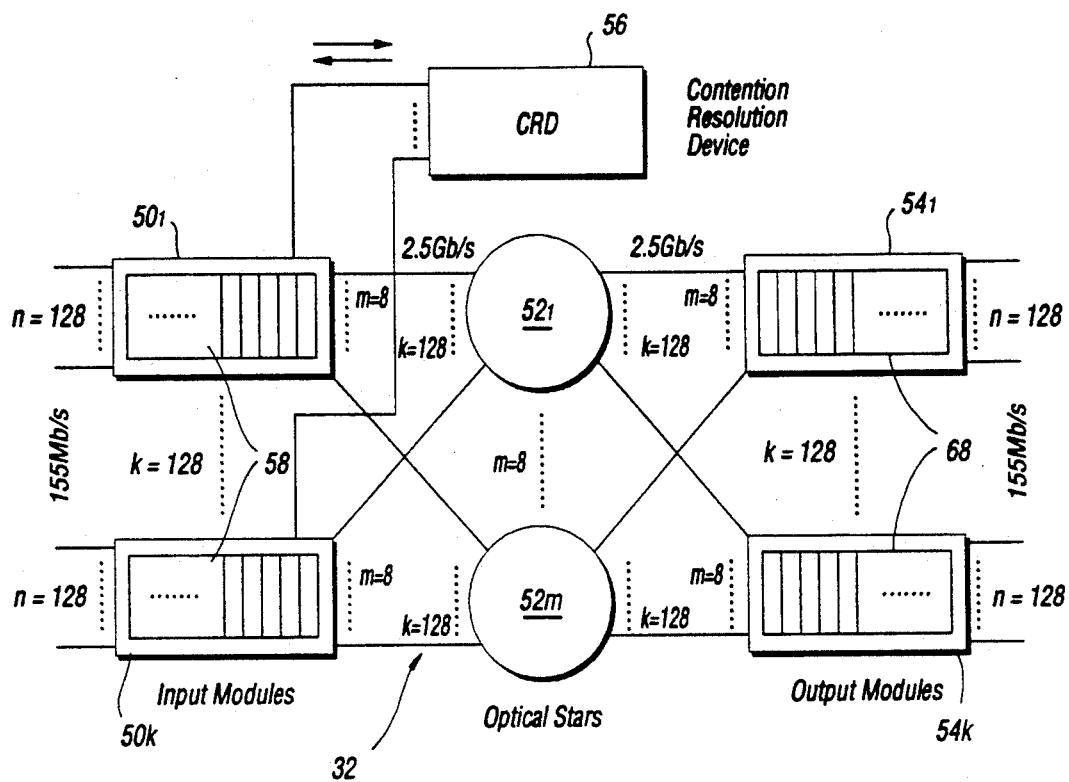
FIG. 2 is a block diagram of the switch fabric architecture of the ATM switch, shown in FIG. 1, of the present invention.

With combined reference to FIGS. 1 and 2, incoming STS-3c lines are connected to $k=128$ identical input modules 50 each located within the switch fabric 32 and having $n=128$ inputs and $m=8$ outputs. As shown, switch fabric 32 also contains m $k \times k$ optical star couplers 52, $k=128$ output modules 54 each having $m=8$ inputs and $n=128$ outputs each, and a contention resolution device (CRD) 56. There are a total of $N=nk$ input lines and N output lines. With this combination, the switch 20 has a capacity of about 2.5 Terabit/S. As described in greater detail below, the input modules 50 provide groups of simultaneous incoming cells, or packets, to the optical star couplers 52 for simultaneous routing therethrough.

The input modules 50, in conjunction with the CRD 56, select appropriate cells from the input ports of the input modules, for carriage through the optical star couplers 52 in order to eliminate the occurrence of output contention, i.e. two or more cells attempting to simultaneously reach the same specific output port within output modules 54. Outgoing cells conducted through the optical star couplers 52 are directed to output modules 54. Each of the output modules 54 directs each of the outgoing cells received by that module, but without the accompanying routing header, to one of $n=128$ appropriated output ports on that module. Each of these ports is then connected via an outgoing STS-3c line to multiplexers 30 and therethrough to the cross-connect 26 back to either a user line or a high speed link to another network switch.

Generally, the rate at which ATM cells or packets are transmitted through the input and output lines is not relevant in explaining the architecture or operation of the switch. However, for purposes of the present invention, it is assumed that the input and output lines transmit ATM cells at the STS-3c rate (i.e., 155.52 Mbits/S). Excluding the SONET section, line, and path overhead, the effective payload rate is 149.76 Mbits/S. Thus, at this bit rate, a 53 byte ATM cell is delivered through an STS-3c line every 2.83 $\mu$S. The input lines could come from demultiplexing higher rate trunk lines carried over SONET ST-24 or STS-48. The output lines can also be multiplexed into higher rate signals.

With continuing reference to FIG. 2, each input module 22 preferably includes a single queue, or buffer, in which ATM cells from its n inputs are deposited. One cell from each input is placed in a queue shown generally by reference numeral 58, in order of input port number, in an STS-3c cell cycle time (i.e., 2.83 $\mu$S). The first cell in the queue 58 is from input port number 1, the second cell is from input port number 2, and so on. This order is important because maintaining it allows this switch to do ATM switching with cell sequence preservation at rates which are multiples of the STS-3c rate, as described in greater detail herein below. Some input lines may deliver idle cells, in which case nothing is put in the queue 58. The number of cells added to the queue 58 of an input module 50 in a cell cycle time can be less than n.

Before entering an input module 50, cells go through a process of virtual channel identifier (VCI) translation and routing header addition, as previously discussed. This consists of reading the original VCI associated with the cell, and consulting a table (not specifically illustrated) to find the new VCI value and the switch output port number to which the cell is destined. The VCI is replaced and the routing header, for internal switch use only, is prepended to the cell. In the preferred embodiment, the routing header is divided into two fields. As noted above, one field (the "L" field) specifies the output module 54 and the other field (the "H" field) specifies which output port on the output module 54 the cell is to be delivered.

With continuing reference to FIG. 2, the input modules 50 and the output modules 54 are connected as a 3-stage Clos network. However, the switch 20 does not function like a Clos network since cells for any given virtual circuit can go through any of the m=8 optical stars 52. In a Clos network, a virtual circuit can use any of the units in the intermediate stage but, once chosen, all cells for that virtual circuit must take the same path. A cell at an input module 50 is destined for one of the N=nk output lines of the switch 20. The cell will first be routed to the output module 54 which services the cell's destination output line, using any available optical star coupler 52. This part of the routing is performed ignoring which of the n output lines on an output module 54 is the actual final destination. Groups of cells, up to k in number, are switched through each of the optical star couplers 52. Which of the m optical star couplers 52 a particular cell goes through depends on its position in the queue 58 and on the results of the contention resolution performed by the CRD 28, as explained in greater detail herein below. The transmission time of an ATM cell through an optical star 52 is about 1/16 of the STS-3c cell cycle time (i.e., 2.83 $\mu S/16 = 177$ nB).

Switch Operation

In discussing operation of the switch 20, consider k cells at the head of the queue 58 (HOQ) of the input modules 50. Each cell will carry information, previously identified as the L portion of the routing header, specifying the output module 54 to which it is to be routed. Since cell traffic is non-deterministic, there may be more than one cell destined to any of the k output modules 54, although the optical stars 52 can deliver only one cell to each of the output modules 54. It is the function of the CRD 28 to choose one cell for each output module 54. Of course, there may be no cells destined for some of the output modules 54.

Operation begins with the input modules 50 transmitting requests to the CRD 56 for those cells at the HOQ. These are requests for cells to be allowed to be routed through an optical star coupler 52 to one of the k output modules 54. Preferably, the information provided to the CRD 56 by the input modules 50 is the L routing header. A bit field indicating cell priority class could also be provided to the CRD 56. The CRD 56 resolves contention and responds to the input modules 50, allowing some input modules to transmit a cell while preventing other input modules 50 from transmitting. Cells that won contention are routed through the first k×k optical star 52.

A pointer associated with the queue 58, which marks the HOQ, is now advanced by one cell only at the queue of the input modules 50 that won arbitration, since each input module includes a single queue. Requests are now transmitted by the input modules 50 to the CRD 56 for those cells at the new HOQ. Contention is resolved and contention winner cells are routed to the output modules through the second k×k optical star 52. This process is repeated in sequence for the rest of the m optical stars 52 and then cyclically back to the first optical star coupler. The optical star couplers 52 can be routing cells to appropriate output modules 54 substantially continuously if the CRD 56 resolves contention m times faster than the cell transmission time through one optical star coupler. That is, an arbitration cycle must be over in $(177nS/m)/\mu S$. For the switch 20 embodiment shown in FIGS. 1 and 2, this is approximately 22 ns.

Figure 3:
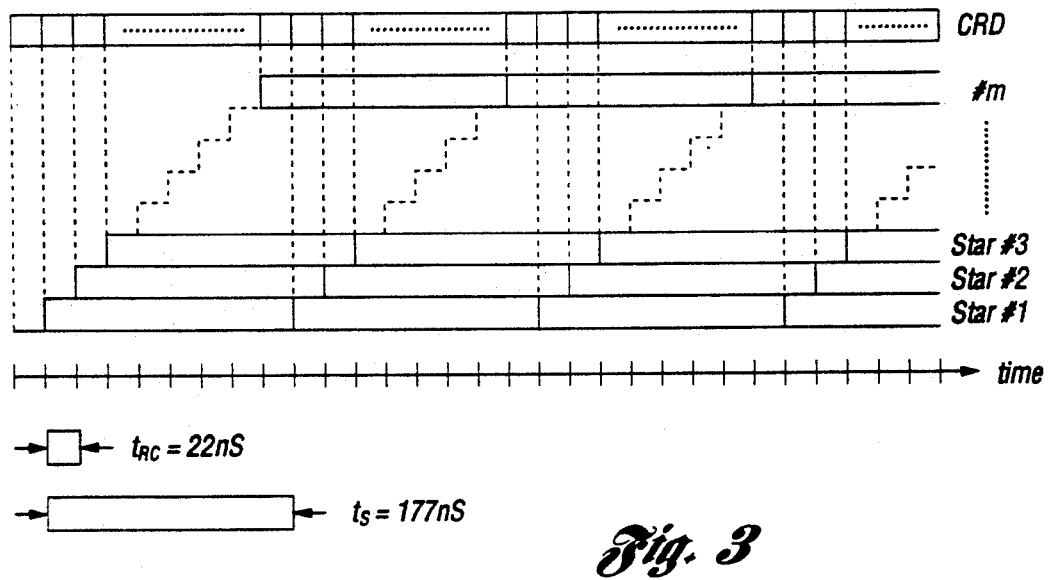
FIG. 3 is a timing diagram illustrating the staggered operation of the "m" switching planes and the contention revolution device shown in FIG. 2.

Referring now to FIG. 3, there is illustrated the time staggered, or phased, operation of the m optical stars 52. One of the limits to switch capacity, for a fixed number of input modules 50, is given by the maximum speed of contention resolution. This determines the maximum number of optical star couplers 52 that can be serviced. As illustrated, the time interval for one contention resolution cycle ($t_{CR}$) is 22 nS and the time interval for switching a batch of k cells through one optical star coupler 52 ($t_s$) is 177 nS.

Cells arriving at the output modules 54 are preferably kept in sequence depending on which input port they arrive, i.e., depending on which optical star coupler 52 the cells came through. A cell is first taken from the first input port of the output module 54 and placed in the output module queue 68 (shown in FIG. 2). A cell is taken next from the second input port of an output module 54 and placed in the queue 68, and so on to the last port. This is repeated cyclically over the m input ports. The output modules 54 then route cells in their memory to the final destination output ports. Thus, the output modules are in effect an m×n shared buffer memory switch. Although there is a single physical memory in each output module 54, a separate logical queue is kept for each of the output ports. The input modules 50 also operate like a memory switch (n×m) with some differences. Which of the m output ports of an input module a cell takes depends on when it reaches the HOQ (which determines which optical star 52 is next), and also depends on the results of arbitration (i.e. contention resolution).

Input and Output Modules

Figure 4:
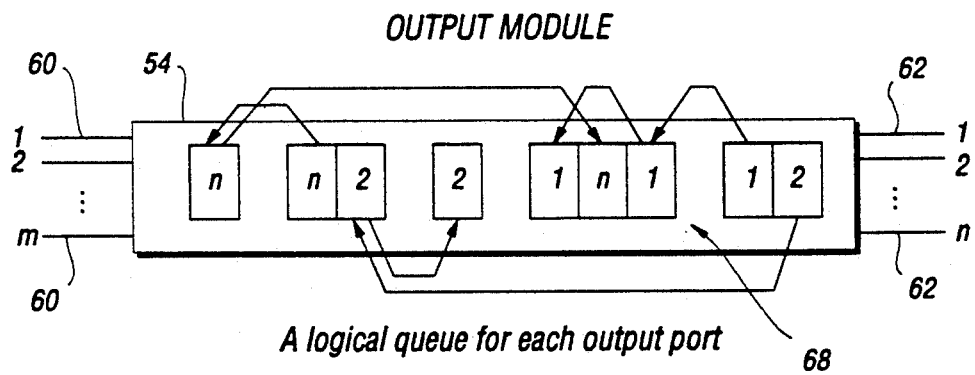
FIG. 4 is an illustration of the buffer management technique for an output module for use with the present invention.

Referring now to FIG. 4, the queue 68 of the output module 54 is preferably implemented with a shared memory. Most preferably, and as illustrated, the queue 68 contains a separate logical queue for each output port 62. These separate logical queues, or linked lists, include separate pointers for the first (i.e. HOQ) and last entries therein. For the output modules 54, cells are taken sequentially, one from each input port 60, starting with the first port. When a cell is taken from one of the input ports 60, the routing header is examined by the output module 54, which reads the output port address, or the "H" portion of the header, to determine to which output port 62 the cell is destined. The output module 54 then writes, or stores, the data portion of the cell at the end of a linked list of cells queued for that particular output port 62. There is a linked list of cells queued for each of the output ports, but all occupy the same physical memory, as shown in FIG. 4. After servicing each of the input ports 60 in this manner, the output ports 62 are serviced next. The cell at the head of the linked list for the first output port 62 is routed in bit-serial form to the first output port 62. The same is done for the rest of the output ports 62 in sequence. Thus, reading begins with the first queue, sequentially proceeds to the $n^{th}$ queue and cyclically repeats after a complete memory write cycle. Preferably, the logic which handles the linked list pointers and the memory is fast enough to service every input port, 60 and every output port 62 in one STS-3 cell cycle time. Also preferably, there is a one-cell buffer at each of the m input ports 60 used to collect a complete ATM cell before it is written into memory. Similarly, there is a one-cell buffer at each of the n output ports 62 to receive a cell that has been read from memory. The cell is then transmitted bit-serially to the appropriate output line.

The output modules 54 are 8×128 shared buffer memory switches (or 128×128 in equivalent STS-3c lines, since the rate of each input line to an output module is 16 times the rate of one STS-3c line.) With such an output module 54, it is preferable to write to memory, read from memory, and do the pointer manipulations for an ATM cell in 2.83 μS/128=22 nS. There are two ways to approach this. Higher speed memory can be used, or the word size that is read or written into memory at a time can be increased. Alternatively, the entire cell could be written in parallel, in which case there would be about 11 nS to do a memory write and 11 nS to do a memory read. This is possible without having to use the fastest and most expensive memory chips.

Figure 5:
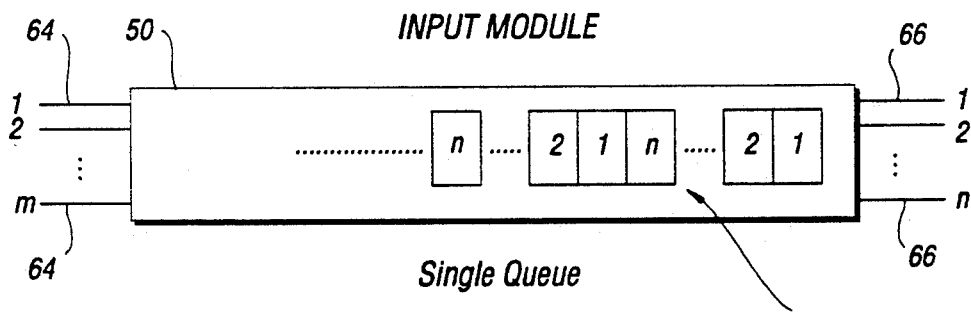
FIG. 5 is an illustration of an input module which utilizes a single queue, for use with the present invention.

Referring now to FIG. 5, in order to use a memory switch at the input modules 50, some changes in operation are necessary. Cells are taken sequentially from the n input ports 64, but they are stored in a single queue 58 implemented in a shared memory containing a buffer. With respect to any one input module 50, that module successively reads the current incoming ATM cell appearing at each of its inputs 64 and writes,, or stores, the cell into the next available location in the queue 58. This proceeds continuously, cycling through all of the inputs 64 in a circular, phased manner. As shown in FIG. 5, there is no decision at this point as to which output port a cell will take.

An additional logic unit is needed to handle communications between the input modules 50 and the CRD 6. In the preferred embodiment, this unit sends the L portion of the routing header and priority information of the cell at the HOQ to the CRD 56, which determines whether any two (or more) ATM cells currently situated at the HOQ in the input modules 50 are contending for the same output module. The CRD 56 responds with a 'yes' or 'no' as to whether this cell can be routed through the next optical star 52 to the destination output module 54, as explained above. Further details regarding the input modules 50 and output modules 54 are provided in the above-referenced co-pending United States Patent application.

Contention Resolution Device

As previously described and shown in FIG. 2, the present invention contemplates a cell cycle time at the switch input lines of 2.83 μS and concentrates groups of n=128 input lines into single input queues 68 in the input modules 50. This concentration forces a tradeoff. The number of requests the CRD 56 must operate on at a time is 128 and the cell cycle time is 22 ns. CRD 56 may be a device such as described in U.S. Pat. No. 5,157,654, issued Oct. 20, 1992.

Figure 6:
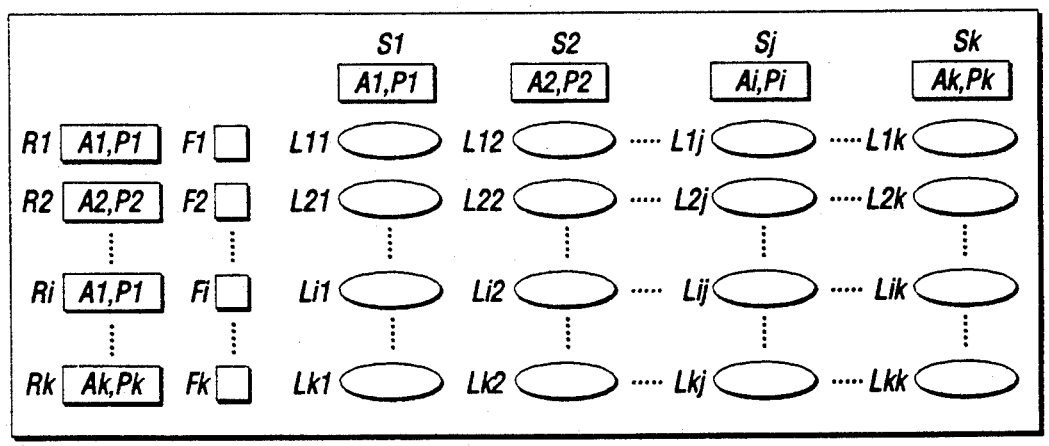
FIG. 6 illustrates an arrangement of registers and logic unit comparators for the contention resolution device.
Figure 7:
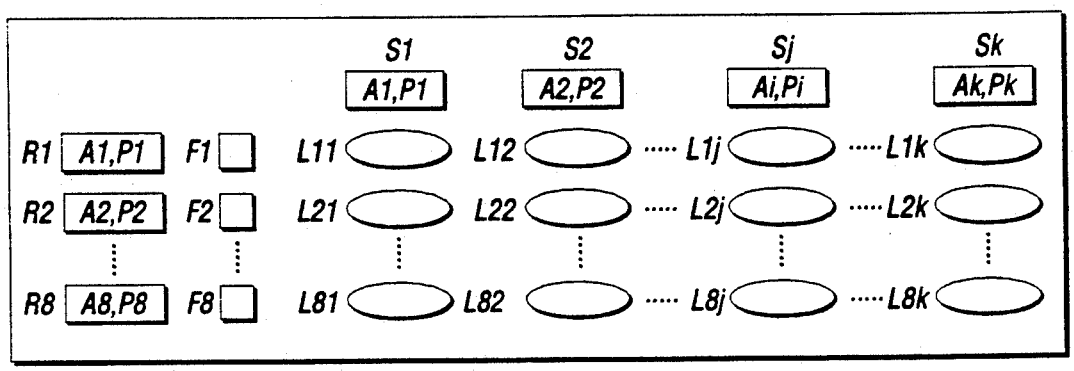
FIG. 7 illustrates an arrangement of registers and logic unit comparators entering into a single CMOS chip.

With reference now to FIGS. 6 and 7, the CRD 56 receives k=128 requests, one from each of the input modules 50, for the input module to be allowed to transmit the ATM cell at the HOQ. Each request specifies an output module number (k possible values). Of course, the request may include other information such as cell priority class. As an example, assume that the cell at the HOQ of input module number i is destined for output module Ai and has cell priority class Pi. These numbers are transmitted to the CRD 56 and stored in local registers not specifically illustrated. The CRD 56 compares all pairs (Ai,Pi) for i=1,2 ... k to each other. Because of the time constraint, assuming current CMOS technology, all $k^2$ comparisons have to be done in parallel using $k^2$ separate simple logic units. If several comparisons could be performed sequentially in a cell cycle time, the amount of hardware required would be smaller.

With continuing reference to FIGS. 6 and 7, in the preferred embodiment, the CRD 56 includes 2k registers Ri,Si, i=1,2, ... k with i=1,2, ..., k and $k^2$ logic unit comparators Lij with ij=1,2, ..., k. At the beginning of a contention resolution cycle, Ri and Si are loaded with the request from input module i. Logic unit Lij receives input from registers Ri and Si and compares the contents of the two registers. These logic unit comparators are very simple devices since they only need to make an address comparison over a 7 bit field (for k=128) and a priority class comparison over 3 bits (for 8 priority classes). Logic unit comparator Lij decides whether the request from the input module i loses against the request from input module j. Preferably, the output of the logic unit comparator Lij is a single bit having a value of '1' if input module i loses. The logical OR of the outputs of the logic units on a row is taken to set the state of the one-bit register Fi. The value of Fi is transmitted to input module i giving the result of contention.

For k=128 (the number of input modules 50), the array of logic units cannot be placed on a single CMOS chip. The device can fit, however, on 16 identical CMOS chips each including 8 of the 128 rows of logic units, as specifically illustrated in FIG. 7. Most preferably, the S registers are replicated on each of the 16 chips so that the required input to the logic units is available on-chip. Further detail regarding the operation of the CRD 56 including details on how to handle contention with equal priority comparisons, fairness of access to output ports, and cell priority classes, is provided in the above-referenced United States Patent application.

Optical Interconnect

Referring once again to FIG. 2, it can be seen that the switch 20 utilizes a multiwavelength optical transmission network, or optical interconnect, between the input modules 50 and output modules 54 of the switch. The form of interconnect proposed here is a variant of the known WDM (wavelength division multiplexing) broadcast star networks.

At the center of the optical transmission network is set of m optical star couplers 52, each having the same number of inputs as outputs (i.e. k=128). Such stars are passive devices usually currently made by interconnecting many 2×2 couplers, and are arranged so that the optical power on each input is broadcast in substantially equal amounts to all outputs. Such optical star couplers 52 are substantially wavelength independent, and therefore may be used to combine and distribute many different wavelength signals from individual-wavelength sources to each output. These optical star couplers 52 can be made with extremely low excess loss as well. The optical star coupler 52 shown in FIG. 1 is a low-loss, integrated optical star with 128×128 dimension. The principal limitation on the optical star couplers 52 is the large number of individual 2×2 couplers it requires to make up a star of any significant size.

Figure 8:
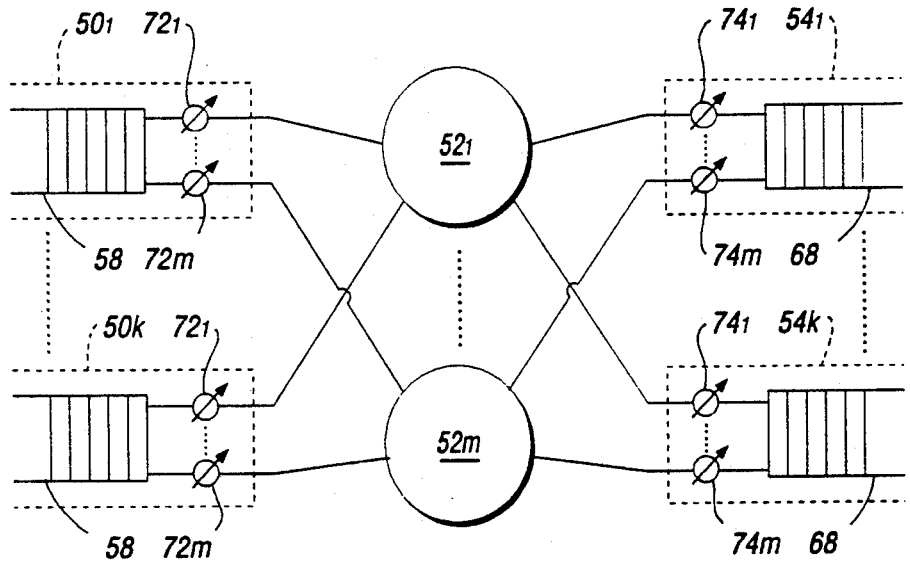
FIG. 8 is a block diagram of the optical interconnect network of the present invention, which utilizes tunable lasers, optical star couplers and fixed-tuned receivers.

With reference now to FIG. 8, in the preferred embodiment, the output fibers from an optical star coupler 52 are preferably coupled to an array of wavelength-selective optical fixed-tuned receivers 74. Each fixed-tuned receiver includes an optical filter, tuned to a different and fixed wavelength, and a photodetector, as described in detail below. The input fibers of the optical star coupler 52 are preferably coupled to an array of tunable lasers 72, each of which may be tuned over the same exact array of wavelengths as is established by the fixed-tuned receivers 74. In this scheme, by tuning a tunable laser 72 to a particular wavelength λj, the signal from that tunable laser will be routed passively to a particular fixed-tuned receiver 74 tuned to receive wavelength λj. The signal, of course, is also broadcast to all of the other fixed-tuned receivers 74 as well, but the optical filters of those other fixed-tuned receivers 74 do not allow the signal to pass.

The use of tunable lasers here rather than tunable receivers is based on the need for high-speed tunability in the switch 20, and the fact that the switch 20 is not intended for use as a multicast switch, such as that disclosed in the previously referenced issued United States patent titled "A Broadband Optical Multicast Switch."

With combined reference to FIGS. 2 and 8, the optical interconnect network preferably consists of m=8 optical stars 52, each having k=128 input and output ports for connection to the input modules 50 and output modules 54. In the preferred embodiment, each of the k input modules 50 includes m=8 tunable lasers 72 and each of the k output modules 54 includes m=8 fixed tuned receivers 74. Each output module 54 is assigned a single receiver wavelength, which is the wavelength address of every receiver 74 in that output module 54. The purpose of using m optical star couplers 52, and their associated tunable lasers 72 and fixed-tuned receivers 74, is to provide the time-staggered, simultaneous transmission from the input modules 50 to the output modules 54 of m-times the capacity of a single star interconnect, as described in greater detail above with reference to FIG. 3.

To summarize, the optical interconnect includes m=8 optical star couplers 52, each with k=128 input and output ports. The optical interconnect also includes k×m (i.e. 128×8) tunable lasers 72, each tunable to k=128 distinct wavelengths in a time substantially less than the 177 nS transmission time of the 2.5 Gbit/S ATM cell. Furthermore, the optical interconnect includes k×m (i.e. 128×8) fixed-tuned receivers 74. All fixed-tuned receivers 74 in a given output module 54 are tuned to the identical wavelength, and there are k=128 different such wavelengths, one for each output module 54. Preferably, there is sufficient optical power budget to allow for the splitting losses associated with the optical star couplers 52. Additionally, the tuning range of the tunable lasers 72 is preferably sufficient to allow for adequate separation of the wavelength channels, taking into consideration such factors as tuning accuracy and variation, as well as the bit rate on the channel. The filters used to separate the wavelengths at each fixed-tuned receiver 74 is an important element in determining the channel spacing, which will be limited largely by crosstalk. This in turn will determine the required laser tuning range. Also preferably, sufficient time should be allowed and a scheme provided for the stabilization and registration of the wavelengths of the tunable lasers 42 and the fixed tuned receivers 44.

Figure 9:
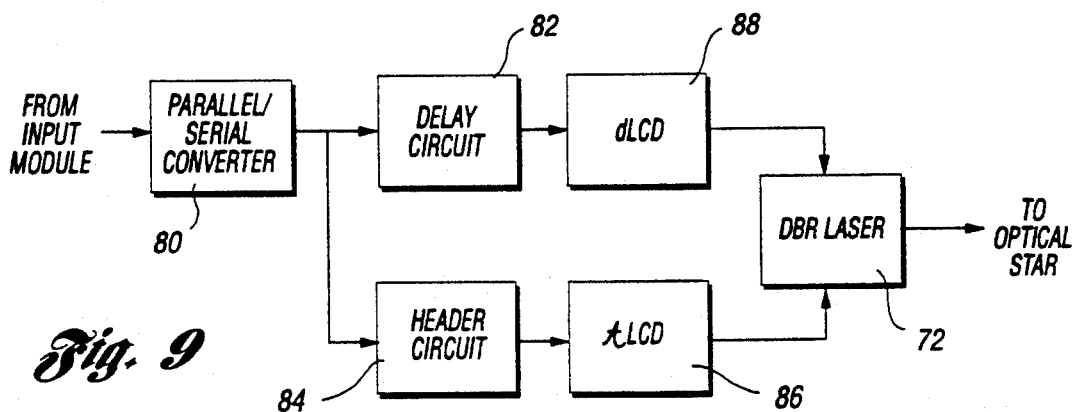
FIG. 9 is a block diagram of a laser driver circuit for driving the tunable lasers shown in FIG. 8.

Referring now to FIG. 9, there is shown a laser driving circuit for use with the present invention. Data packets with internal routing header (H,L) are transmitted in electric form through parallel lines from a demultiplexer in an input module 50 to a parallel/serial converter 80. The serial electrical signal from the parallel/serial converter 80 is presented to a delay circuit 82 and to a header decoder 84. The header decoder 84 decodes the "L" portion of the routing header only. In the preferred embodiment, for each value of "L", the header decoder 84 produces a unique voltage output to the tuning laser current driver (tLCD) 8 6. The tLCD 86 converts this voltage to a unique current, which tunes the tunable laser 72 to the unique wavelength specified by the value of "L". "L" specifies an output module number, such that for output module number j, the wavelength specified is λj. The tunable laser 72 can be a distributed Bragg reflector (DBR) laser. The delay circuit 82 is included to delay the data bits until the header decoder 84 and the tLCD 86 have done their work to tune the tunable laser 72 to the wavelength corresponding to the destination output module 54 (not specifically shown in FIG. 9). Data bits with routing header H (excluding L) are preferably transmitted to the data laser current driver (dLCD) 88, which modulates the laser output in order to transmit the data in photonic form through the optical star coupler 52 and to the destination output module 54.

An overall view of the switch design presented in FIGS. 1 and 2 is that there are 128 155 Mbit/S lines which terminate on the inputs to each input module 50 of the switch 20. The input module 50 then multiplexes these input lines onto m=8 output lines at a line rate of 2.5 Gbit/S. This compression in time results in a proportionate decrease in the complexity of the optical interconnect network. Although there are N=16384 actual STS-3c input lines to the switch 20, there are only 8×128=1024 optical fibers in the interconnect network. Thus, a prior art switch of this size would require 16,384 lines of interconnect at each of two stages done electronically. With the present invention, the complexity is reduced to 1024 fibers at two stages. In addition, the interconnect network, because it is optical and preferably made of glass, is entirely passive. The optical interconnect network is therefore extremely reliable, and does not have the stringent timing requirements which are required of most electronic multistage interconnect networks. As a result of its passivity, the optical interconnect network is in a real sense a single-stage interconnect network, even though the optical star couplers 52 themselves consist of several stages of the 2×2 elemental couplers.

Another important advantage of using a passive optical interconnect is the freedom from the electromagnetic radiation and interference which in large and complex systems can significantly increase the cost of metallic systems. Of course, optical links are not entirely immune to electromagnetic interference. optical receivers are designed to be extremely sensitive, wideband amplifiers, and consequently have to be extremely well protected from environmental noise. This is true of the power supply and ground lines as well as the potential pickup on the front end of the receiver amplifier. There is, however, essentially no crosstalk between the fiber transmission lines, and certainly no electromagnetic radiation from those lines to interfere with other equipment.

In summary, the advantages of using a multiwavelength optical interconnect network including tunable lasers 72, optical star couplers 52 and fixed-tuned receivers 74 are a reduction in complexity and improved reliability. Additionally, such a network makes possible an effectively single-stage switch and fewer problems associated with electromagnetic interference and synchronization.

Optical Design

In designing the optical interconnect network, a system performance requirement of a bit error rate (BER) of $10^{-12}$ was established, which requires approximately 0.7 dB more optical power than the more common $10^{-9}$ BER, assuming Gaussian noise. Although the noise is Gaussian, the crosstalk is decidedly not, and the 0.7 dB allowance is completely adequate.

The loss budget for each link in the optical interconnect of the present invention consists of the connector or splice loss from the fiber into the optical star coupler 52, the splitting and excess loss of the optical star coupler 52, the connector loss at the filter/receiver of the output module 54, the insertion loss of the filter, and allowances for margin, nonuniform splitting and wavelength dependence. Allowances f or these losses are quantified as follows:

1. Splitting Loss: $10\log_{10}(k) = 21.1$ dB
2. Star Excess Loss: 0.1 dB/ stage=0.7 dB
3. Splitting Loss Nonuniformity: $\approx 0.1$ dB/stage=0.7 dB
4. Wavelength Dependence: $\approx 1$ dB for 50 nm wavelength range
5. Connector Losses(4):=2 dB
6. Filter Insertion Loss:=5 dB
7. Margin:=3 dB The total loss between the tunable lasers 72 and the fixed-tuned receivers 74 is therefore estimated to be about 33.5 dB, which, for a 1 mW laser output (into a fiber), implies a required receiver sensitivity of about $-33.5$ dBm at a BER of $10^{-12}$ or a sensitivity of about $-34.2$ dRm at a BER=$10^{-9}$.

Figure 10:
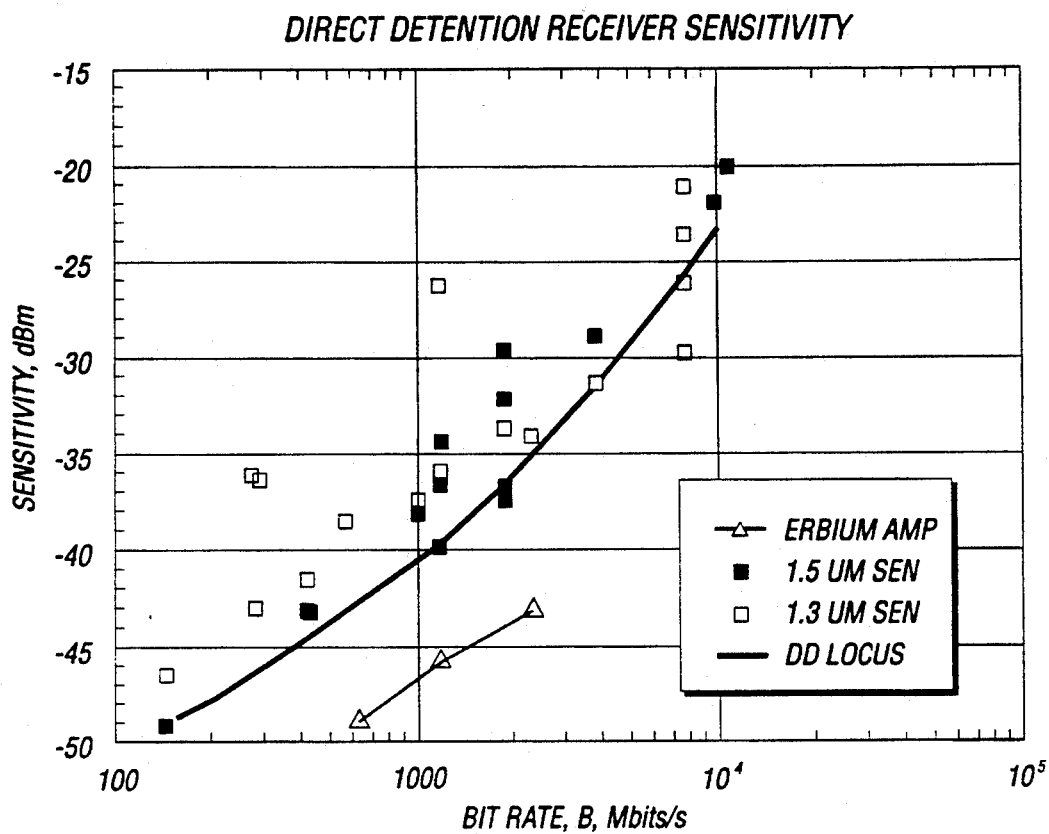
FIG. 10 is graphical representation of the direct detection receiver sensitivity.

Referring now to FIG. 10, there is shown a graphical representation of sensitivities of direct detection avalanche photodiode receivers (APD) available today, plotted at both 1.55 μm and 1.3 μm wavelengths and bit rates of interest. A locus is drawn through the best of the results. Also shown in FIG. 10 are three recent sensitivity results for direct detection with an erbium-doped fiber preamplifier. The erbium-doped fiber preamplifier results indicate the possible power budget improvement attainable with direct detection, but it should be noted that the results were obtained in an amplifier with less than 3 nm bandwidth at full width at half maximum (FWHM). In addition, a 0.6 nm tunable filter was used to eliminate shot noise from the amplified spontaneous emission from the amplifier.

At 2.5 Gbit/S, the nominal line-rate of the WDM channels in this optical interconnect, it can be seen that the preferred direct detection optical fixed-tuned receivers 74 would have a sensitivity of approximately $-35$ dBm at $10^{-9}$ BER. In actuality, however, two further allowances should be made in a practical system, one for the manufacturing tolerances on the receivers 74, and another for the fact that the real line rate in the interconnect would be higher than 2.5 Gbit/S.

Typical manufacturing allowances are assumed here to be 2-3 dB. The actual line rate will be determined by the 177 nS packet transmission time and the portion of that which must be used for frequency tuning, locking and clock alignment. Assuming these can be performed in 50 nS then the transmission of 53 bytes plus destination address (7 bits) in 177 nS gives an effective line rate of 431 bits/127 nS=3.39 Gbit/S. At 3.5 Gbit/S, the sensitivity has degraded to about $-32.5$ dBm. This indicates that, including these allowances, the actual fixed-tuned receivers 44 would be operating at a sensitivity of about $-30$ dBm, whereas a sensitivity of about $-34.2$ dBm is desired as previously discussed (all sensitivities adjusted to $10^{-9}$ error rates). Thus, the power budget is about 4 dB short. The results quoted above indicate that the use of higher power tunable lasers 72 combined with fiber preamplifiers will overcome this limitation.

Another issue with the use of fiber preamplifiers in a system such as this, however, is simply the complexity their use introduces into the overall design. There are $8 \times 128 = 1024$ fibers entering the output modules 54, each of which would need an erbium-doped fiber amplifier. This means an additional 1024 lasers to pump the amplifiers and produce the gain, introducing complexity.

One concern with the use of optical amplifiers in multiwavelength systems is the effect of signal level on crosstalk between wavelengths due to amplifier nonlinearity. So as to preclude the occurrence of cross-talk, in one embodiment of the switch 20 the amplifiers can be placed on the input side of the optical star couplers 52, where there is only one wavelength. The total power levels at the inputs of the optical star coupler 52 are nominally the same as at the outputs of the optical star coupler, such that the amplifiers would be working at essentially the same levels relative to their saturation points. Saturation output powers of erbium-doped fiber amplifiers are about +20 dBm.

Fixed-Tuned Receivers

As previously stated, each fixed-tuned receiver 74 preferably includes an optical filter and a photodetector. The optical filter, such as the Fabry-Perot filter and the Mach-Zehnder interferometric filter, or the like, is utilized to select the wavelength of the output module 54. The parameter of concern for each of these filters is the channel separation required for low error rates and minimal crosstalk. The need for small channel spacing comes from the fact that the tuning range for high-speed tunable lasers 72 is limited to 7-11 nm at the present time. 7nm/128 channels implies a needed channel spacing of 0.55 angstroms, or about 7 GHz.

Figure 11:
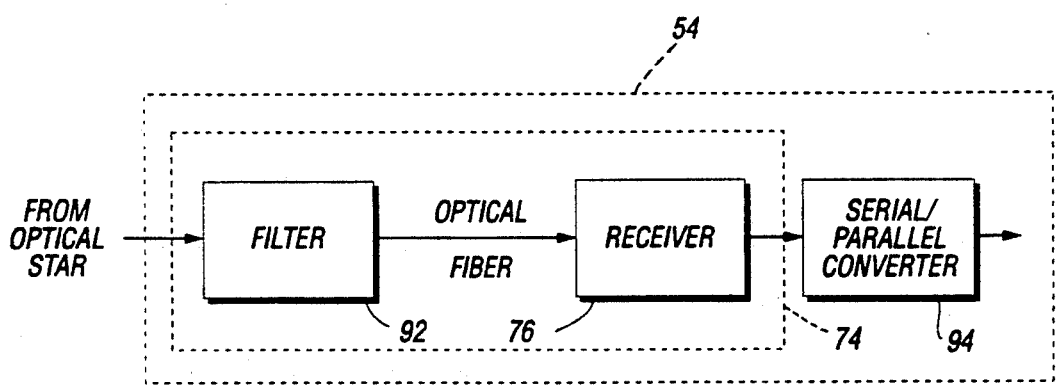
FIG. 11 is a block diagram of an optical to electronic detector of an output module for use with the present invention.

Referring now to FIG. 11, there is shown a block diagram of an optical-to-electronic detector which utilizes the preferred filter, a Fabry-Perot filter 92. The optical signal from an output optical fiber of an optical star coupler 52 is presented to the Fabry-Perot filter 92, which is tuned to transmit only one wavelength (with sufficient bandwidth for fast data transmission). All Fabry-Perot filters of an output module (only one shown in FIG. 11) are tuned to the same wavelength, but there is a unique wavelength for each output module 54. The filtered optical signal is presented to the receiver 76 (e.g. an avalanche photodiode), which converts the optical signal to bit-serial electrical form. This electrical signal is then sent to a serial to parallel converter 94 for further processing within the output module 54.

The Fabry-Perot filter has been demonstrated in two forms, the Fiber Fabry-Perot (FFP) and the liquid crystal Fabry-Perot (LQFP). The FFP is fabricated with mirrors deposited directly on the ends of two fibers, and it is tuned by changing the mirror spacing with a piezoelectric actuator (not specifically illustrated). The LQFP is a Fabry-Perot etalon with a liquid crystal material between the two mirrors, and it is tuned by applying a small (e.g.<5 V) voltage across its short dimension. Both the FFP and the LQFP can be designed to have large Free Spectral Ranges (FSR>100 nm) and with finesse around 200. The largest finesse measured for the FFP is 500.

A channel count of 100 wavelengths, separated by 10 GHz in optical frequency, each carrying 622 Mbit/S has been attained, wherein the frequency selective filter was a multistage Mach-Zehnder integrated optic 128-channel filter. Although it is not known what the response of this filter would have been if it were operated at higher bit rates, the results indicate that filters do exist which can separate narrowly spaced channels of the total channel count desired here.

It can be shown that, with regard to crosstalk between channels, several Fabry-Perot structures (i.e. single pass, double pass, and vernier tuned cavities), the theoretical limit due to both crosstalk and receiver noise to the number of channels yields $N=F/2$ for a 0.5 dB crosstalk power penalty, where N is the number of channels and F is the finesse of the filter (for a single-pass FP filter), with the filter bandwidth equal to B, the bit rate of the signal. Although this implies that a finesse of about $F=256$ is required in order to support the 128 channels in this switch design, such a figure is probably optimistic and it is more reasonable to assume that $N=F/3$, giving slightly larger channel separations. A finesse of about 400 would then be required to provide the number of channels. This is thought to be within reason, although somewhat higher than today's average results.

The insertion loss of such filters is quite low, as low as 2–3 dB, but in the power budget discussed above a more conservative number of 5 dB was assumed. The Mach-Zehnder filter quoted above had an insertion loss of 6.7 dB. The tuning times of these filters are all in the several mS range, which is completely adequate for the switch 20, since the filters will be tuned to fixed frequencies, and only adjusted to account for environmental variations, such as ambient temperature changes.

Tunable Lasers

In the preferred embodiment, tunable lasers 72 have sufficient tuning range to cover all of the 128 fibers, or channels. For a channel spacing of $\delta v = 2B$, where B is the bit rate and v is optical frequency, the tuning range required of the tunable laser is $256B = 896$ GHz. Since one nanometer (nm) corresponds to about 130 GHz at a 1.5 $\mu$m wavelength, the laser tuning range is preferably about 7 nm. This uses the minimum channel separation of 2B. For a channel separation of 3B, the required tuning range is about 11 nm. Both of these ranges have been demonstrated in semiconductor lasers, with the largest continuous tuning range demonstrated in a semiconductor laser being about 7.1 nm, achieved with a tunable twin-guide (TTG) laser.

In one embodiment, the switch 20 employs a multi-section distributed Bragg reflector (DBR) laser, which has a "quasicontinuous" tuning range on the order of 10–11 rim. "Quasicontinuous" tuning means that the laser hops modes as it is tuned, and therefore has a discontinuous tuning curve versus current, but that any wavelength within the range can be addressed by a suitable combination of currents. For a high density WDM systems, such as that of the present invention, continuous tuning is preferable.

Alternatively, if 7 nm or 11 nm is insufficient, an integrated array of tunable lasers could be employed, which have already been demonstrated to have quasi-continuous tuning ranges of over 20 nm. To achieve a tuning range of over 20 nm, three lasers, each having a quasicontinuous tuning range of 7 nm, can be integrated in a manner so that their emission wavelengths are staggered, achieving a total tuning range of 21 nm. This is the largest electronic tuning range yet demonstrated for a semiconductor laser, albeit only quasicontinuous tuning. The waveguide combiner loss was compensated by an integral semiconductor laser amplifier, with a total output power of about 1 mW at any given wavelength.

A tunable laser array including a $7 \times 20$ array of surface-emitting lasers, each of which may be made tunable, has been demonstrated. The wavelength range reported to date is 43 rim. Although this array operated at 0.98 $\mu$m, it is thought the results are extendable to 1.5 $\mu$m. With such a source, the tuning range limit of a single optical star coupler could approach the 1 Tbit/S mark, assuming that a means for combining the outputs of each of the lasers could be found.

In the preferred embodiment, semiconductor injection-current tunable lasers 72 are utilized because of the requirement to tune the lasers to any given wavelength within a few tens of nanoseconds. Generally, this requirement rules out the use of external cavity lasers with mechanical tuning, even though tuning ranges for these have been demonstrated in excess of 100 nm. Tuning speeds for 3-section DBR lasers have been demonstrated in the 10–20 nS range. The modulation speeds of these lasers are so far rather limited ($\approx 500$ Mbit/S), so in the switch 20 of the present invention, it may be necessary to include external modulators. This would reduce any laser-chirping problem as well.

Figure 12:
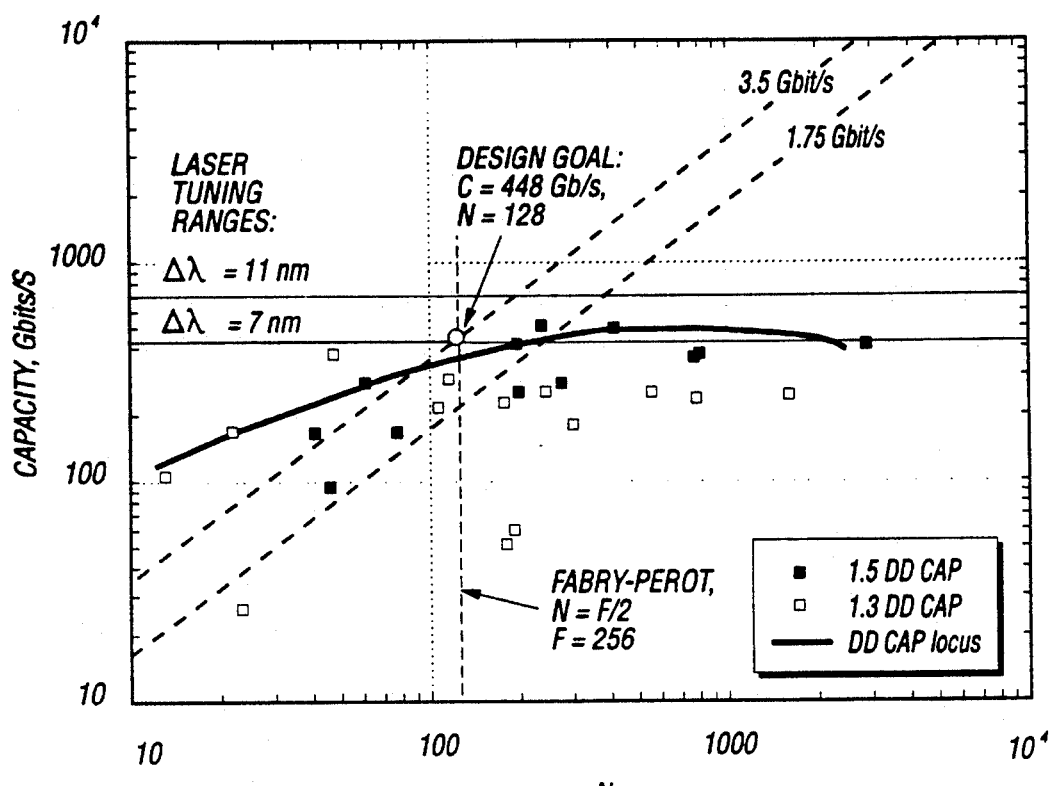
FIG. 12 is a graphical representation of the capacity limits of a single multi-wavelength star interconnection network.

Referring now to FIG. 12, there is shown a graph summarizing the above discussion on the requirements for the optical interconnect, wherein the interconnect capacity of a single optical star coupler 52 (i.e. $B \times N$), versus the number of inputs (i.e. N), is plotted. The capacity limits of a single multiwavelength star interconnect are determined by the power budget, the laser tuning range and the resolution of the optical filter (i.e. the filter finesse).

The direct detection sensitivity results of FIG. 10 are shown for both 1.3 and 1.5 $\mu$m wavelengths and are plotted in terms of the star capacity that they represent in FIG. 12. The power budget capacity limit is largely derived from the splitting loss of the $N \times N$ optical star coupler and the dependence of the receiver sensitivity on the bit rate. Basically, at any fixed bit rate, B, as one increases N, $B \times N$ moves along a diagonal line of constant B until the 1/N splitting loss is equal to the power budget limit imposed by the transmitter power, the required receiver power, and the other losses in the system. Since this $B \times N$ limit will be different at different bit rates, a curve is obtained representing the power budget limit to the capacity of a single star.

The open and closed data points are for the 1.3 $\mu$m and 1.5 $\mu$m data mentioned previously. The solid curve labeled "DD CAP locus" is the locus of the best of the direct detection results. In plotting this limit curve, a transmitter launched power of 1 mW and a bit error rate (BER) of $10^{-9}$ were assumed, along with the loss budget outlined above. An allowance for receiver manufacturing tolerances was not included.

FIG. 12 includes the results projected for an optical star network that might be obtainable with the erbium-doped fiber preamplifier previously described. These results represent a detection sensitivity of 152 photons per bit. Although there is potential for capacity improvement, it should be noted that for the results plotted, the increased capacity comes at the expense of having to build a much larger optical star coupler. This would also require a much larger laser tuning range. To reduce the size of the optical star would require operating the optical interconnects at bit rates in excess of 10 Gbit/S.

The point labeled "Design Goal" on FIG. 12 represents a capacity of 448 Gbit/S with N=128. This is a little higher than the power budget curve, and it can be shown that by increasing the laser power to 2 MW, rather than 1 mW, the power budget curve passes above the design goal and achieves a BER of $10^{-12}$ as desired. The solid horizontal lines labeled "Laser Tuning Ranges" indicate the capacity achievable with 7 nm and 11 nm ranges. For the case of N=F/2, 7 nm is sufficient. The dashed line labeled Fabry-Perot indicates the maximum number of channels that can be achieved for a filter finesse of F=256 with N=F/2. The dotted lines labeled "3.5 Gbit/S" and "1.75 Gbit/s" indicate the locus of constant bit rate on the plot, and give some idea of the scaling which would occur if one reduced the bit rate by a factor of two.

Figure 13:
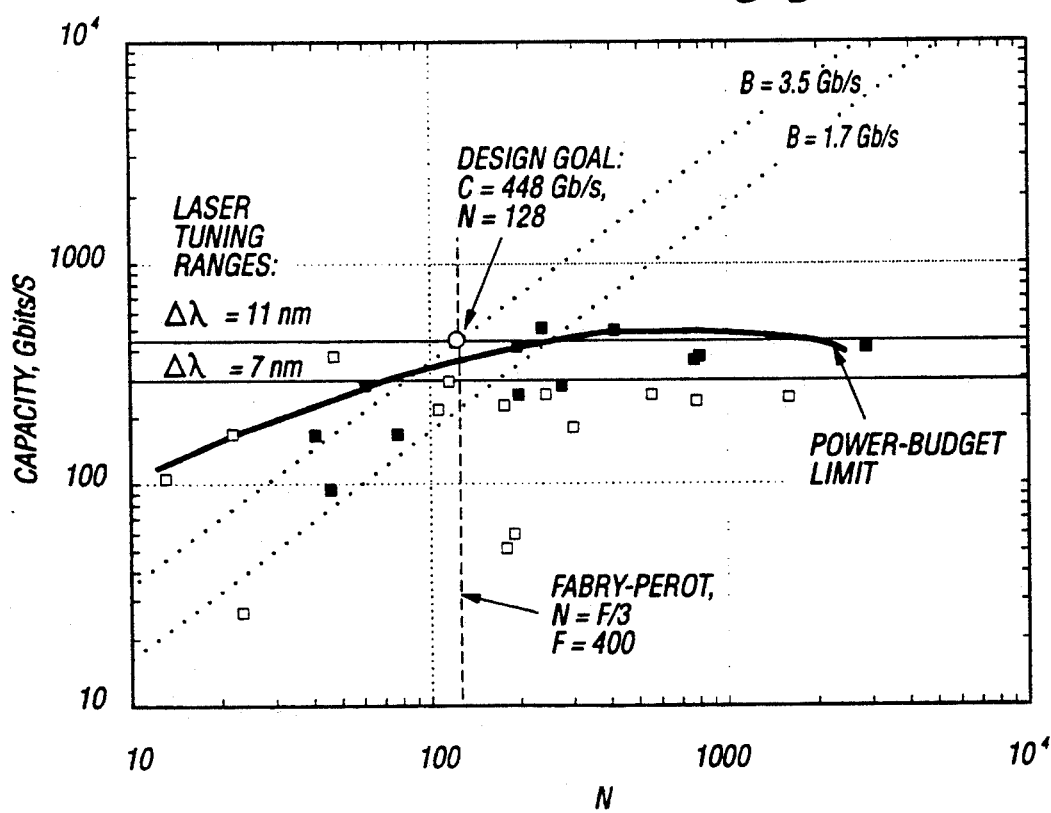
FIG. 13 is a graphical representation of the capacity limits of a single multi-wavelength star interconnection network, as in FIG. 12, for a slightly relaxed channel spacing.

Referring now to FIG. 13, there is shown a graph illustrating a plot of the capacity limits for the case where N=F/3, a slightly more conservative channel spacing. It can be seen that it becomes necessary to increase the finesse of the filter to about 400 and to use a larger tuning range (e.g. 11 nm) for the tunable laser 72. When viewing the design as in FIGS. 12 and 13, it can be seen that nearly all the optical components are stressed to about the same degree.

Scaling

To further understand the interrelationships between the various elements of the design, and to also consider the impact of scaling the switch 20 back, a discussion of the scaling rules for the optical interconnect follows.

The switch capacity, measured in numbers of STS-3 channels, is given by:

$$C = k \times n, \tag{1}$$

where k the number of input modules,
and n=the number of input ports per module, assuming that each input module 50 carries one STS-3 signal.

The capacity can also be written as:

$$C = (m) \times (k) \times \left[\frac{n}{m}\right] \tag{2}$$

where m=the number of outputs per input module 50, and n/m=the number of STS-3 channels per input module output. The variable k also represents the size of each optical star coupler 52, since each optical star coupler is connected to each input module 50, and m is also the number of optical star couplers 52, since each of the m outputs of each input module go to a different optical star. Therefore, k represents both the number of wavelengths and the size of the optical star coupler 52, as well as the number of input modules 50. The factor n/m is the number of STS-3 channels carried on each wavelength.

Equation (2) above is the preferred scaling rule for the switch capacity. Three examples of scalings are considered below, with the variable s, a small integer value, representing a scaling factor. In the first example, the value of k is decreased from k to k/s. This means that the number of wavelengths and the size of each of the optical star couplers 52 is reduced by a factor of 1/s. The capacity C will also be reduced by 1/s, and the power budget will be increased by $10\log_{10}(s)$ dB, due to a reduction in splitting loss. The number of optical star couplers 52 will remain the same, as will the number of inputs and outputs per module, but the number of input modules 50 and output modules 54 will decrease by 1/s. The line speed of the fiber links will not change. Referring again to FIG. 12, this corresponds to moving along a constant bit rate contour as the number of inputs to the optical star coupler 52 is scaled. The number of wavelengths will decrease by the same 1/s factor, which will decrease the required laser tuning range.

In the second example, the value of m is increased to m×s. This is an increase in the number of outputs per module, and equivalently, an increase in the number of optical stars 52 by a factor of s. There is no change in the size of the optical star couplers, k, and there is no change in the capacity C. However, the time for contention resolution will decrease by 1/s. The line speed of the fiber links will decrease by 1/s, with an attendant increase in the power budget due to the dependence of the receiver sensitivity on bit rate. If s=2, the receiver sensitivity will increase by about 6 dB for the parameters of this design. In FIG. 12, this corresponds to moving vertically, along a constant number of inputs, N, line. Note that FIG. 9 is capacity per star, so that in this scaling, the number of stars increases proportionately, so that the total switch capacity is constant.

In the third example, the value of n is decreased to n/s. This is a decrease in the number of input ports 64 on each input module 50. The capacity then scales to C/s, the speed of the fiber links becomes B/s, and there is the same increase in the power budget as in the preceding example. The number and the size of the optical star couplers 52 remains the same. In FIG. 12, this corresponds to moving vertically, along a constant N line, to a new value of bit rate.

Of course, other scalings can be derived from the above examples. There are therefore many ways to scale such a switch to smaller switches in order to accommodate any particular technological limitation.

Fault Tolerance and Recovery From Failures

The most likely failure associated with an optical star coupler 52 is the failure of the tunable lasers 72 or of the fixed-tuned receivers 74. When one of the tunable lasers 72 fails, then the input module 50 that controls it loses the transmission slot through the corresponding optical star coupler. This is preferably handled by forcing this input module 50 to send a no-request to the CRD 56 once every m cycles. The input module 50 will thus lose a fraction 1/m of its output bandwidth. The other input modules 50 can use the optical star coupler. When one of the fixed-tuned receivers 74 fails, then the output module 54 that owns the receiver 74 cannot receive through the corresponding optical star coupler. This can be handled by modifying the CRD 56 so that it can force an arbitration loss for that specific output module 54 once every m cycles. The output module 54 thus loses a fraction 1/m of its input bandwidth. The other output modules can receive through the optical star coupler 52.

Failure of one of the optical star couplers 52 would be a very unlikely occurrence, although such a failure is easy to handle. In this case, the CRD 56 is programmed to indicate arbitration loss to all input modules 50 when the time slot for the failed optical star coupler comes up. An alternative procedure is to inform the input modules 50 that a particular optical star coupler 52 is simply unavailable. All the input modules 50 would send a no-request to the CRD 56 during the corresponding slot. Note that all input and output ports are still served, but at a reduced capacity. The fractional loss of capacity of the switch is 1/m.

Figure 14:
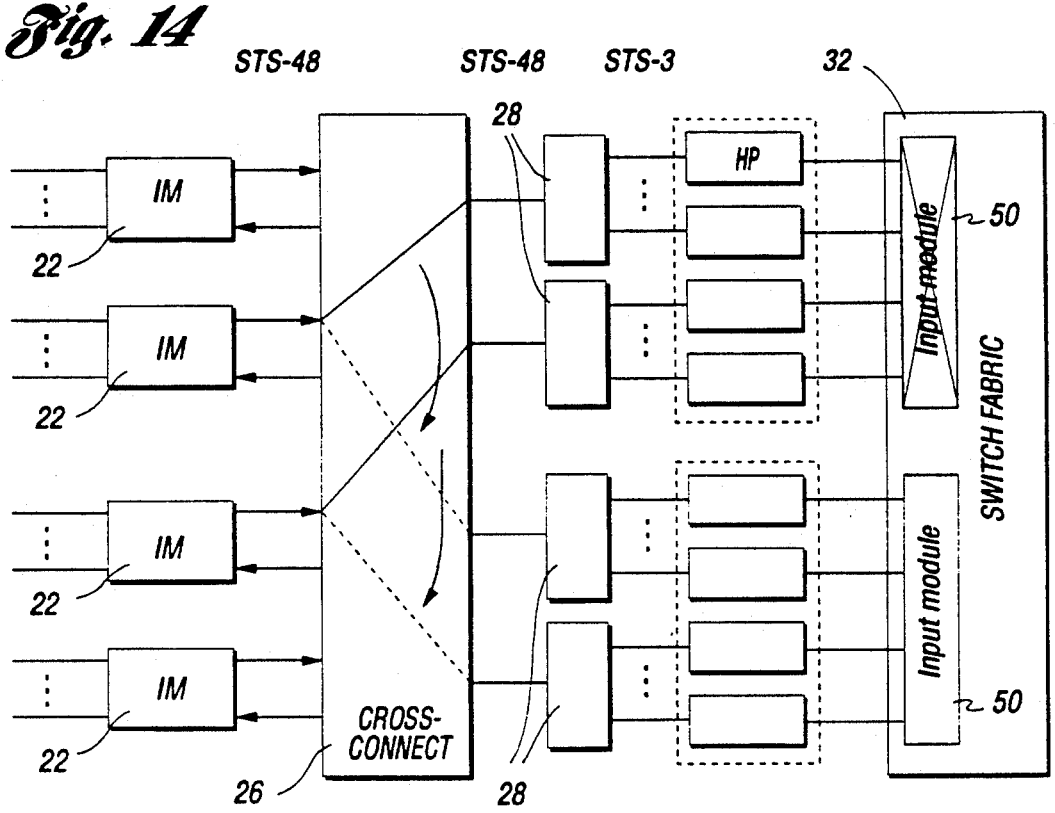
FIG. 14 is an illustration of the actions necessary for substituting a working input module in the switch fabric for a failed input switch module.

Referring now to FIG. 14, failure of one of the input modules 50 (shown with an "X" through it) results in the loss of service to n STS-3 input lines. Although this is a fraction $1/k = 1/128$ of the total number of input lines, it is preferably to initiate action to restore service to these lines as soon as the failure is detected. The input lines to a switch this size will likely come from STS-48 trunk lines, most of which originate in the interface modules. These STS-48 lines go through a cross-connect 26 before they are demultiplexed into STS-3 signals. After demultiplexing, cells are extracted from the SONET payload. Header processing occurs next in the header processing units of the interface modules, which processing consists of ATM cell virtual channel identifier translation and routing header addition. In our switch architecture an input module serves 128 STS-3 lines that originate from eight STS-48 trunks.

Assuming that a few of the $k = 128$ input modules 50 are kept in standby to substitute for any failed modules, service can be restored to the eight STS-48 trunk lines by reconfiguring the cross-connect 26 to route the trunks to a standby input module $50_S$, as shown in FIG. 14. The header conversion tables for the 128 STS-3 lines have to be moved. This can be done by the switch control module 34 (shown in FIG. 1) that handles call processing. The switch control module 34 preferably communicates with the header processing units which are part of the interface modules 22, every time virtual circuits are added or dropped; it therefore has knowledge of the conversion tables. The cross-connect reconfiguration can be done by circuit switching the trunk lines. The cross-connect 26 need not have full $1024 \times 1024$ STS-48 circuit switching in order to provide this function; it is only necessary to be able to circuit switch all STS-48 trunks to and from a few standby modules.

Figure 15:
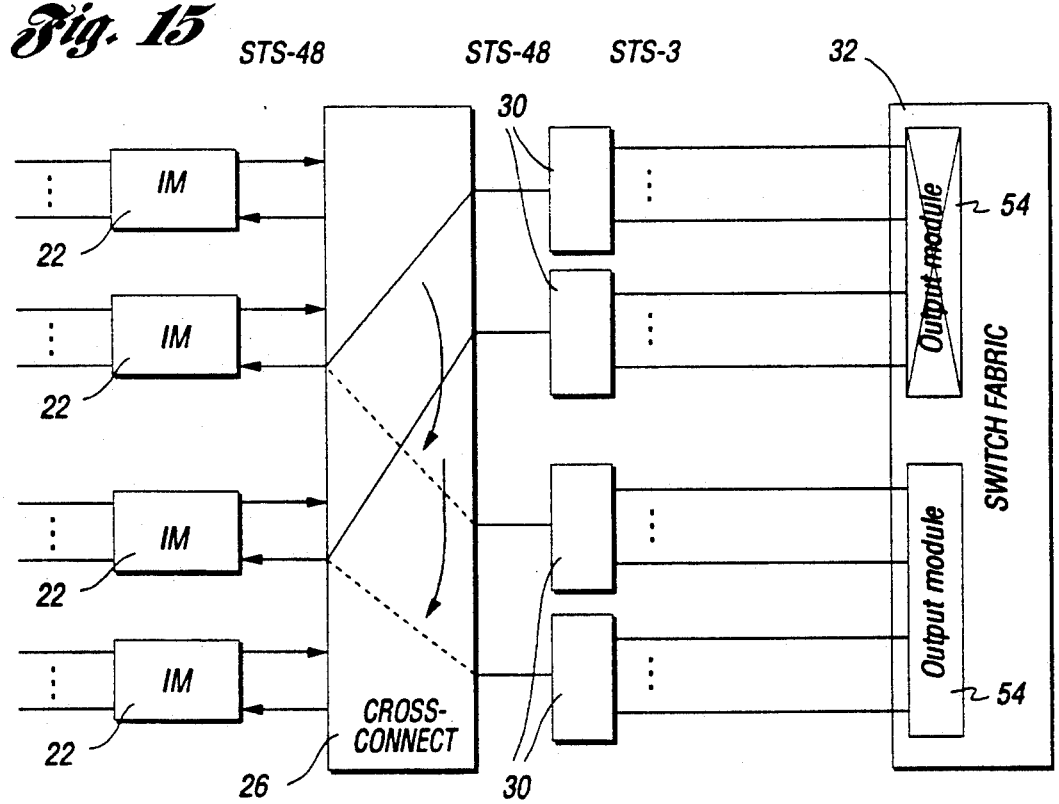
FIG. 15 is an illustration of the actions necessary for substituting a working output module in the switch fabric for a failed output module.

Referring now to FIG. 15, failure of one of the output modules 54 results in suspension of service to 128 STS-3 output lines, which should be restored. As in the case of the input modules 50, assuming that a few of the $k = 128$ output modules 54 are kept in standby to substitute for any failed modules (shown in FIG. 15 with an "X" through it), substitution is again done by reconfiguration of the cross-connect 26 and by other actions. The cross-connect 26 is reconfigured so that one of the standby output modules 54 can service the eight affected STS-48 trunks, as shown in FIG. 15. However, ATM cells for virtual circuits that were being routed through the failed output module 54 must now be routed to the substitute output module $54_S$. This requires changing the L value of the routing header for those circuits. These virtual circuits can come from any of the STS-3 input lines. It would be too time consuming to try to locate all of them unless tables are kept and even in that case it would be necessary to make special changes in the translation tables of almost all header processing units. Instead, a scheme is proposed to simplify the re-routing.

Before an ATM cell goes into the switch fabric 32, the header processing units, which are part of the interface modules 22, looks at the virtual channel identifier and consults a table to determine the output port number required from that cell which is coded by the "H" and "L" portions. As we have seen, the "L" portion determines which output module 54 the cell is to be routed. The scheme proposed utilizes a second translation. Using this "L" value, the header processing unit 38 will consult a second table. This will translate "L" to "L'"; a logical to physical translation. "L'" instead of "L" will be prepended to the cell for routing. The purpose of this is to be able to substitute easily one output module 54 for another by simply changing the value of one of the table entries. Such a change redirects cells that were going from one output module 54 to another. The change has to be made in every STS-3 input line header processing unit, but it is the same change everywhere. The logical to physical translation can be done by simply using "L" as an address into the memory where the "L'" values are stored so that it adds very little time to header processing. In the example we are using, for $k = 128$, it takes only 128 bytes of memory for a 7 bit to 7 bit translation.

Failure of the CRD 56 could result in total switch failure. A solution is to provide redundancy. It is therefore proposed to include three CRD units and additional logic which would detect a failed CRD unit by 2 to 1 vote, and signal the failure to the switch control module 34. The vote taking unit can be divided into a number of independent units each serving, for example, one input module. This is necessary because the vote taking device can also fail. Since a CRD unit represents less than 0.1% in terms of VLSI chip count for a switch of this type, this redundancy is an inexpensive proposition.

This switch architecture has a relatively small failure group size and easy to implement failure recovery procedures. None of these measures require call management reprocessing of the affected virtual circuits. There will be lost cells but the calls will still be active. Some of the lost cells might, of course, be cells destined to, or from, the control module for call management procedures. However, all call management communications must involve a link layer with error recovery.

Gigabit/Sac ATK Switching

Figure 16:
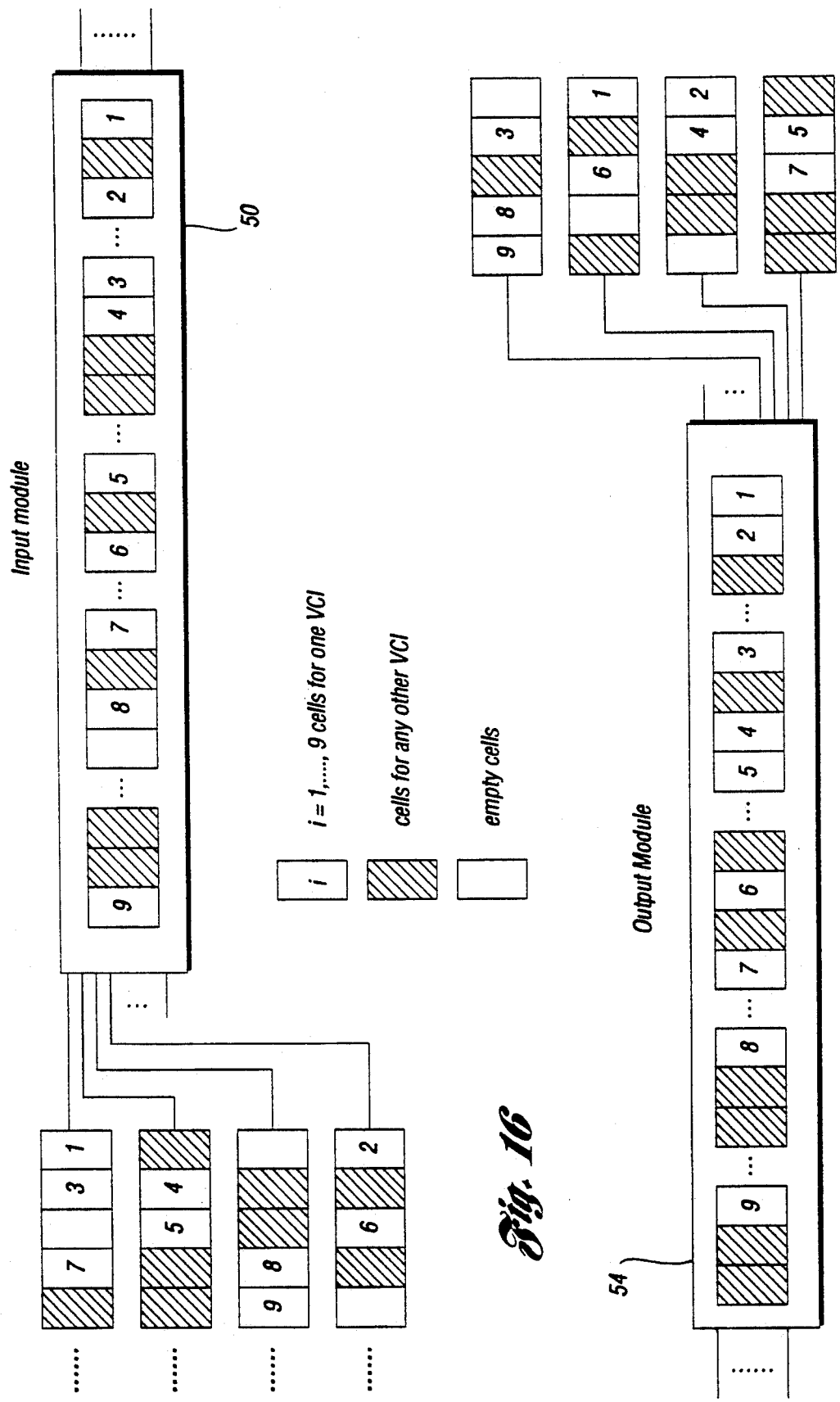
FIG. 16 is a block diagram of the cell sequence preservation for trunks.

The switch 20 of the present invention maintains the sequence of cells that originate in one specific input module 50 and end up in one specific output module 54. This is the case whether these cells went through the same or through different optical star couplers 52. To provide Gigabit/sec ATM cell switched services, a number of lines of the input modules 50 and output modules 54 are trunked together. The output module 54 would use a single logical queue for its output lines which are being trunked. FIG. 16 illustrates this for the case of a virtual connection on four STS-3 lines trunked together, wherein cells destined to a trunk on an output module 54 are kept in sequence after switching through the cross-points. A logical queue sequence is shown for the output module 54.

Gigabit/sec ATM cell switched services, up to 128 times the STS-3 rate can be provided. Even in the absence of higher than STS-3 rate ATM services, the ability of virtual circuits to share lines of interoffice trunks can be used to increase network performance. In this case, a cell at an output module 54 of the switch 20 can use any of the output lines which form a trunk, assuming, of course, that the trunked lines preserve cell sequence. This can be done by defining STS-3nc signals or by other equivalent means.

The switch architecture described above can grow from a relatively small configuration. Any growth strategy preferably takes into account the relative cost of the components. Since the cost of the m=8 optical star couplers 52 is much less than that of the 128 input modules 50 and 128 output modules 54, the following growth strategy is attractive. This involves initial installation of all optical star couplers 52 and a partial installation of input and output modules. With all of the optical star couplers 52 installed, all ports of the input modules 50 and output modules 54 can be used. It is the optical star couplers 52 which will have a number of unused lines. Growth is achieved by adding input modules 50 and output modules 54 which are connected to the unused optical star lines. It is inexpensive either to have the full sized CRD 56 in a partial configuration. The costs of the interconnect can be a significant fraction of the total, but it is difficult to estimate because of more rapidly changing technology. However, using the proposed growth strategy, most of the interconnect can be added as more input and output modules are added.

In summary, the above discussion presented an ATM switch design which combines electronic information processing and switch control with multiwavelength optical interconnection networks. In particular, a switch 20 was described which will achieve a switch capacity of 2.5 Tbit/S. It has been demonstrated that the signal processing and contention resolution are within the capability of present day electronics for a switch with 16,384 STS-3c input lines, and that the optical interconnect network is feasible. The scaling of the switch 20 to smaller capacities was discussed, showing how trade-offs in the various parameters can be used to overcome particular technological limitations. Fault tolerance and recovery schemes were presented, showing that with minimal increase to the switch complexity and cost, a very reasonable fault recovery scheme is available for almost every sort of failure. The combination of optical interconnection using tunable multiwavelength star networks and electronic contention resolution and buffering results in a reduction in the complexity of such switches resulting from the high interconnection bit rates in the optical network. This reduction in complexity is accompanied by very high switch capacities.

It is to be understood, of course, that while the form of the invention described above constitutes the preferred embodiment of the invention, the preceding description is not intended to illustrate all possible forms thereof. It is also to be understood that the words used are words of description, rather than limitation, and that various changes may be made without departing from the spirit and scope of the invention, which should be construed according to the following claims.

What is claimed is:

1. An optical switch for switching a succession of ATM cells, each ATM cell being received on one of a plurality of input lines and each being switched to one of a plurality of output lines to which it is directed as determined by an embedded identifier in each received cell, comprising:
    a plurality of input modules, each input module connected to a different subset of the plurality of input lines and each input module comprising a buffer for sequentially storing ATM cells received on the input lines to which it is connected and a tunable laser that is tunable to a plurality of different wavelengths;
    a plurality of output modules, each output module connected to a different subset of the plurality of the output lines and each output module comprising an optical receiver fixed-tuned to receive one of the plurality of different wavelengths to which the tunable lasers in the input modules and tunable;
    a contention resolution device electrically connected to each of said plurality of input modules for selecting from a head of queue of ATM cells stored in the buffer of each input module at most one ATM cell to be transmitted during a cell transmission time to each output module; and
    an optical star coupler connecting said input modules and said output modules for simultaneously transmitting to each output module during each cell transmission time the ATM cells selected by the contention resolution device form the head of queue of ATM cells stored in the buffers of the input modules;
    the tunable laser in each input module which has an ATM cell selected to be transmitted being tuned during each cell transmission time to the wavelength associated with the receiver of the output module connected to the output line to which the selected ATM cell is directed as determined by the embedded identifier in the selected ATM cell when received by one of the input modules.

2. An optical switch in accordance with claim 1 wherein the embedded identifier in each ATM cell has a first field representing the particular output module to which it is directed, the laser in each input module being tuned in response to that first field during the cell transmission time to the wavelength associated with the fixed-tuned receiver in that particular output module.

3. The optical switch in accordance with claim 2 wherein the embedded identifier in each ATM cell has a second field representing the particular output line of the output module to which it is directed, each output module comprising means for detecting the second field in each received ATM cell and directing the received ATM cell to the output line represented in the detected second field.

4. The optical switch in accordance with claim 1 wherein each of said input modules comprises m tunable lasers, each of said output modules comprises m optical receivers, each of the m optical receivers associated with each of the output modules fixed-tuned to receive the same one of the plurality of different wavelengths to which the tunable lasers in the input modules are tunable, and said switch further comprises a total of m optical star couplers, the kth ($1 \leq k \leq m$) star coupler connecting the kth tunable laser in each input module to the kth fixed-tuned receiver in each output module, said contention resolution device selecting form the head of queue of ATM cells stored in the buffer of each input module at most one ATM cell to be transmitted to each output module by the m tunable lasers in each input module in a time-staggered sequential manner respectively through each of the m optical star couplers.

5. The optical switch in accordance with claim 4 wherein m is less than or equal to the cell transmission time divided by a time required by the contention resolution device to select cells to be transmitted.

6. The optical switch in accordance with claim 4 wherein each one of the fixed-tuned receivers in each output module includes an optical filter for filtering wavelengths transmitted by the tunable lasers in the input modules other than the wavelength associated with that one fixed-tuned receiver, each optical filter providing for small wavelength spacing.

7. The optical switch in accordance with claim 6 wherein the optical filter included in each fixed-tuned receiver is connected to one of the optical star couplers for receiving the ATM cells transmitted by the input modules and each fixed-tuned receiver further comprises a photodiode connected to the optical filter for converting to electrical format the particular cell transmitted at the one wavelength associated with that one fixed-tuned receiver and passed through the optical filter.

8. The optical switch in accordance with claim 4 wherein each tunable laser is tunable to any one of its plurality of different wavelengths in a time substantially less than the cell transmission time, thereby providing high-speed tunability to the optical switch.

9. The optical switch in accordance with claim 8 where the tuning range is about 7 nm to about 11 nm.

10. The optical switch in accordance with claim 4 further comprising a plurality of optical preamplifiers each one separately interconnecting one of the tunable lasers and an input of one of the optical star couplers.

11. The optical switch in accordance with claim 4 further comprising a plurality of optical preamplifiers each one separately interconnecting an output of one of the optical star couplers and an input of one of the fixed-tuned receivers.

12. A method of switching a succession of ATM cells, each ATM cell being received on one of a plurality of input lines and each being switched to one of a plurality of output lines to which it is directed as determined by an identifier embedded in the received cell, different subsets of the output lines being associated with different fixed wavelengths, the method comprising the steps of:

sequentially storing the ATM cells received on different subsets of the input lines;

determining from the embedded identifier the destination subset of output lines of each ATM cell in a head of queue of stored ATM cells associated with each different subset of input lines;

resolving contention between different cells at the head of queue of stored ATM cells that are directed at the same time to output lines in the same subset of output lines so that at most only one ATM cell is selected for transmission during a cell transmission time to the same subset of output lines;

simultaneously optically transmitting to the different subsets of output lines over an optical star coupler during the cell transmission time each cell selected for transmission each at the wavelength associated with the subset of output lines to which the cell is directed as determined by the embedded identifier in the selected cell when received on one of the input lines;

in each one of the different subsets of output lines filtering all the possible different transmission wavelengths other than the one fixed wavelength associated with that one subset of output lines.

13. The method of claim 12 wherein the embedded identifier in each ATM cell has a first field representing the particular subset of output lines to which it is directed, the wavelength at which that cell is transmitted being determined form that first field.

14. The method of claim 13 wherein the embedded identifier in each ATM cell has a second field representing the particular output line in the subset of output lines to which it is directed.

15. The method of claim 12 wherein the cells are tuned to the different possible wavelengths for transmission in a time substantially less than the cell transmission time.

16. The method of claim 15 wherein the tuning range of wavelengths for transmission of cells is about 7 nm to about 11 nm.

* * * * *